United States Patent [19]

Jordan et al.

[11] E Re. 28,620

[45] Reissued Nov. 25, 1975

[54] CARRYING DEVICE FOR MEDICAL AND VETERINARY USE

[76] Inventors: Donald Alfred Jordan, 53 Bayswater Road, Croydon; Laurence John Hartnett, "Rubra," Watts Parade. Mt. Eliza, Victoria, both of Australia

[22] Filed: Aug. 20, 1974

[21] Appl. No.: 499,037

Related U.S. Patent Documents

Reissue of:

[64] Patent No.: 3,740,778
Issued: June 26, 1973
Appl. No.: 234,548
Filed: Mar. 14, 1972

[30] Foreign Application Priority Data

| | | |
|---|---|---|
| Mar. 19, 1971 | Australia | 4369/71 |
| Nov. 24, 1971 | Australia | 7155/71 |
| Mar. 16, 1971 | Australia | 4326/71 |

[52] U.S. Cl. ..... 5/82; 5/86

[51] Int. Cl. ..... A47b 83/04; A61g 1/02

[58] Field of Search ..... 5/82, 83, 86, 89, 317

[56] References Cited

UNITED STATES PATENTS

| | | | |
|---|---|---|---|
| 2,614,266 | 10/1952 | Smith | 5/82 |
| 3,203,009 | 8/1965 | Lundberg | 5/81 R |
| 3,259,922 | 7/1966 | Fischer | 5/86 |

*Primary Examiner*—Casmir A. Nunberg
*Attorney, Agent, or Firm*—Wenderoth, Lind & Ponack

[57] ABSTRACT

A lifting and carrying device comprising a frame and flexible battens having variable attachment means adapted to co-operate with corresponding means on the frame. The battens are adapted to be tensioned so that substantially equal support is given to all parts of the body. The frame is raised slightly in relation to the body to be lifted to ensure that proper tensioning of the battens is achieved.

3 Claims, 7 Drawing Figures

CARRYING DEVICE FOR MEDICAL AND VETERINARY USE

Matter enclosed in heavy brackets [ ] appears in the original patent but forms no part of this reissue specification; matter printed in italics indicates the additions made by reissue.

This invention is concerned with solving the problem of preventing further injury occurring to accident victims or disabled persons caused by the need to move them.

The fundamental cause of these further injuries is not simply that gross body movement occurs but that the support offered by conventional carrying apparatus is inefficient. The support offered by conventional canvas stretchers, for instance and indeed by the several devices designed to overcome the problems of moving persons, is such that the weight of the body is supported at only a few points in the stretcher mainly where the shoulder and buttocks contact the stretcher.

In order to place the accident victim on to a conventional stretcher it is necessary to lift him from the supine position. Several devices have been designed to overcome the need to lift the victim, one of these devices comprising a stretcher frame combined with battens which can be slid under the patient and clipped onto the frame utilizing a curved lip on the ends of the battens. In practise these battens are difficult to slide under patients and equally difficult to clip onto the frame. Also any upward force from beneath the patient would dislodge the battens from the frame. However the most serious drawback is that this device simply simulated the conventional stretcher once the patient was in position, the body weight being effectively supported by only a few of the battens, thus causing the body to shift, once it was lifted.

It has been recognized for some time that in moving injured persons equal support should be given to various parts of the body to reduce body movement to a minimum. A very effective manual system called the Rautek lift is used by ambulance officers in the handling of injured persons. In this method a number of persons (minimum is three) stand laterally astride the prone or supine body and using their hands support the body, primarily at head, shoulders, buttocks and legs, in an even manner so that any injuries are not aggravated.

The Ratek technique is also used for persons injured in the sitting position (as in automobile accidents) whereby the person is lifted in such a way that the sitting posture is maintained, and the vital spinal and pelvic areas supported by the knee of the person lifting the injured person.

Thus the principal object of this invention is to simply mechanise the Rautek lift especially for the handling of persons with spinal or similar injury so that the use of the invention will not only decrease the number of times a person is required to be moved before treatment commences but primarily is concerned with providing adequate support to the injured person so that all parts or vital parts of the body are substantially equally and correctly supported.

The invention also aims at the provision of a support system, desired by the medical profession for accident victims or disabled persons which can be used in a variety of circumstances to which the patient is subjected.

Thus it should be, capable of being used in all accident or lifting environments, be reusable with the minimum of sterilization procedures required and be translucent to X-rays, so that the patient is not required to be moved when X-rays are taken prior to treatment.

According to the present invention there is provided a carrying device for medical or veterinary use where the posture of the body to be lifted and carried is not to be disturbed, comprising a frame adapted to assume a position around or about the body to be lifted, flexible batten means, adapted to be slid under the body, having variable attachment means adapted to cooperate with corresponding means on said frame to secure said batten to said frame, and means adapted to elevate said frame relative to the body to be lifted the length of the batten supporting the body being adjustable by said variable attachment means so that the posture of the body is maintained undisturbed with all parts effectively supported by the individual adjustment of the said respective battens by said variable attachment means.

Conveniently the frame may be of any suitable material of sufficient strength to support a body and can be in any desired configuration. Normally this will be a simple rectangular frame for use instead of the conventional stretcher in accident cases but it can also be varied for moving patients from chairs or beds either in the sitting or supine positions. The rectangular frame for accident use has on its underside shortlegs or other suitable means to raise the top part of the frame sufficiently above ground level so that the battens can be suitably tensioned and varied in length to accept a portion of the body weight. In moving patients from wheel chairs into car seats or from one seat to another or from beds etc. without disturbing the patients posture the frame is placed around or about the patients, depending on the circumstances and the battens are slid underneath the body and secured to the frame.

The device according to this invention thus simulates the Rautek lift but in a more efficient manner as the flexible battens extending underneath the body are comparable to the hands and knees of the persons supporting and carrying the patient as taught in the Rautek technique.

It is important that the frame be elevated in relation to the patients body. Preferably the frame is at least three inches above the base level of the body i.e. ground level if the patient is on the ground. This elevation is necessary so that as tension is taken on the flexible battens it can easily be handled so that part of the weight which was supported by the ground is now taken by the tensioned flexible battens. The result of this tensioning is a shortening or lengthening of the effective length of the flexible batten.

The tensioning of the battens ensures that each batten is properly supporting a portion of the body so that the body is supported at as many points as there are flexible battens. The usual tension taken in fixing the flexible battens to the frame is about six pounds.

In the case of lifting in a sitting position, the batten to support the main body weight is so shaped that the spinal area is supported by the batten along the line of fixing. In this instance the support is at least 9 inches below the frame. This may also apply with patients lifted from beds in the supine or prone positions.

Another frame which may be used instead of the conventional stretcher may include a false frame disposed at that end of the frame where the head and shoulders of the patient lie. This false frame can be raised to form an inclined platform, when the flexible battens are secured, for the head and shoulders. The battens are secured in the normal way and then the false frame is raised and locked in position to provide the inclined support.

Conveniently the flexible battens may be of any suitable material and are usually long enough to extend laterally across the frame either at right angles to it or obliquely to form a criss-cross pattern depending upon the use required. The battens must be stiff enough to be slid under a body so that they can be secured to the frame.

When a body is in a supine position the parts of the body requiring support are not in the same plane and some of the flexible battens will require more curvature (that is greater length) than others, depending on which part of the body is supported. Thus when the body is lifted it will have precisely the same or improved posture that it assumed in the supine position.

Any suitable fastening means for securing the battens to the frame may be used but they should preferably be easily fastened and difficult to remove while the body is in position.

A preferred fastening arrangement is the provision of headed or shouldered spigots on the frame and corresponding holes to closely accommodate said spigots on the battens. Usually there is one hole at one end of a batten and a series of holes on the other end to provide a variable length batten. This series of holes may be staggered and not in a straight line to allow for closer spacing and smaller difference in length of the batten corresponding to each hole.

In order to prevent the battens from easily disengaging the spigots and to also allow easy securing of the batten to the frame, the spigots are inclined inwardly on the frame and are shouldered or headed. The batten curving upward toward the frame will be approximately perpendicular to the spigot and would be easily attachable. Any force applied under the body forcing the batten upward would alter this angle and because of this the accidental removal of the batten is difficult.

The supporting flexible batten used to carry the head is preferably wider than the other battens and preferably includes an inflatable air cushion to support the head and prevent it rolling while the frame is being moved.

The preferred flexible battens used in the present invention are composed of high density polyethylene or high density P.V.C. The edges of these battens are preferably polished and buffed to eliminate surface deformities as such irregularities which can collect undesirable matter which in turn affect the battens translucency to X-rays and impose misleading blemishes to the X-ray picture. The flexible battens are selected for their translucency to X-rays as this avoids having to move the patient from the frame while X-rays are taken.

The preferred flexible battens are easily cleansed and sterilized by wiping with alcohol or a sterilization agent prior to use and do not present the sterilization and cleansing problems associated with conventional stretchers or lifting devices.

In order to allow for ease in sliding the flexible battens under the patients body, towards the leading edge they are tapered and reduced in cross section to decrease resistance.

The battens are usually of approximately rectangular shape (tapered at leading end) especially when used on stretchers but may be of different design when used for lifting in the sitting position. The batten supporting the patients back in a chair frame may for example be of an elongated diamond shape, wide in the centre, tapering toward each end.

The batten for use as a seat is preferably of a special design comprising a U-shaped batten having 2 support points. The perpendicular bisector of the line through these two points will pass through the line of weight due to the pelvic thrust of the patient. This line of weight is through the buttock bones of the patients body and as his weight is concentrated there it is difficult to insert the batten. For this reason an approximately half oval section is cut out of the seat portion so that the seat batten is inserted around the buttocks with the perpendicular bisector of the line between the two support points on each side lying within the plane of the buttock bones of the patient. To aid insertion of buttock batten a further batten is placed behind the knee which raises the thighs.

The frames encompassed within this invention may be handled manually or by using a lifting apparatus comprising a base, a vertical support arm and an adjustable jib arm having at its free end means adapted to secure the frame. This apparatus may be stationary or mobile wherein the base is a wheeled chassis.

The jib is preferably adjustable by an hydraulic jacking mechanism. The jib arm preferably has a pivotable frame securing means which secure the frame about its centre of gravity to stabilize it. This mobile lifting apparatus is extremely useful with incapacitated patients requiring to be lifted in a sitting position for instance. The jib arm extends across the front of the patient and holds the seat batten described above so that the patients weight acts parallel to the perpendicular bisector of the mid point of the two support points. One or more back support battens extend behind the patients back to maintain the sitting position.

A mobile lifting device of this construction may be used to transport invalids from bed to a vehicle and can insert the seated patient through a vehicle doorway and place them in the seat. The suspended chair or body frame is pivotable both horizontally and vertically at the end of the jib arm. Similarly patients who are required to be lifted in the supine position off beds etc. can be so moved by this unit.

A practical arrangement of the invention will now be described in relation to the drawings in which.

Figure 1A:
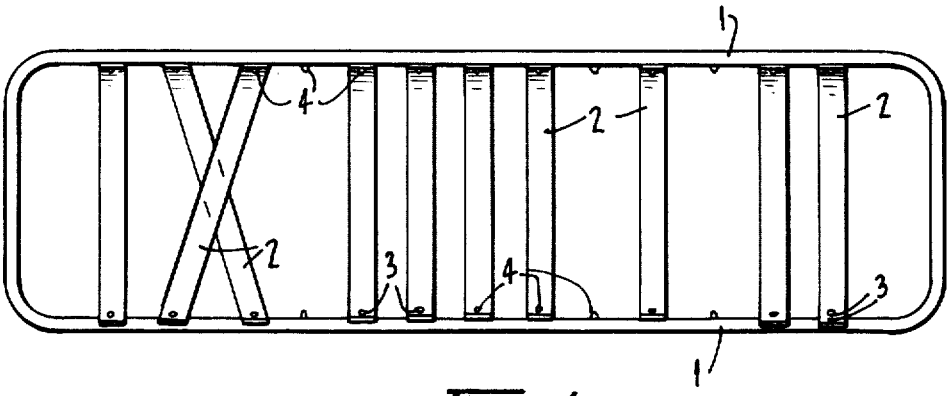
FIGS. 1A and 1B show views of the stretcher according to the invention.
Figure 1B:
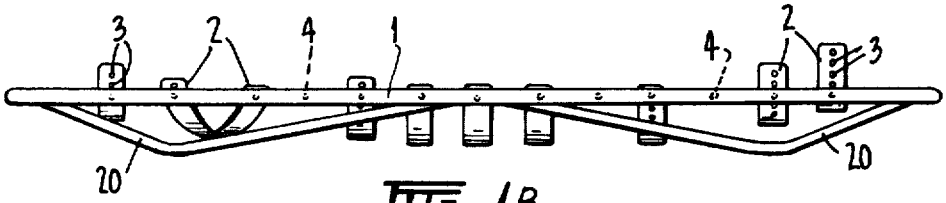
Figure 2:
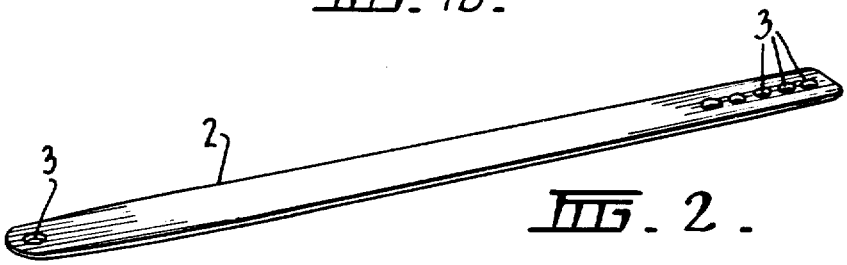
FIG. 2 shows a batten for use on these stretchers.

Referring firstly to FIGS. 1A, 1B and 2, the frame 1 is formed from 1 inch tubular steel and weighs approximately 6 pounds. The frame is coated with P.V.C. An embodiment not illustrated includes a folding frame for easy storage. The frame is elevated by supports 20 to allow for easy tensioning of the flexible battens during use. The P.V.C. or high density polyethylene battens 2 have holes 3 which co-operate with spigots 4 on the frame 1. The spigots are inclined inwardly of the frame to provide secure attachment of the battens to the frame. As is shown a series of holes are provided at one end of the batten so that its effective length is adjustable. The holes may be staggered to provide a finer adjustment to the effective length. The battens may be crossed as shown in FIG. 1 if extra support for a particular part of the body is required.

Figure 3:
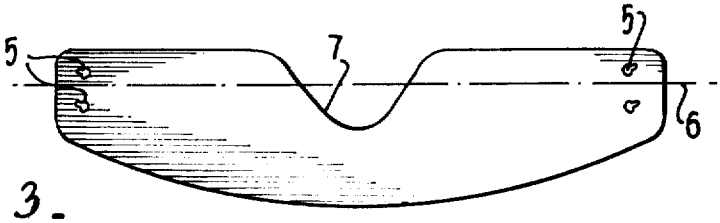
FIGS. 3, 4 and 5 illustrates the batten to be used for supporting the weight of a patient in a seated or supine position.
Figure 4:
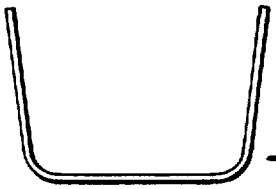
Figure 5:
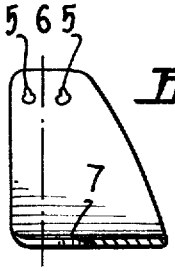
Figure 6:
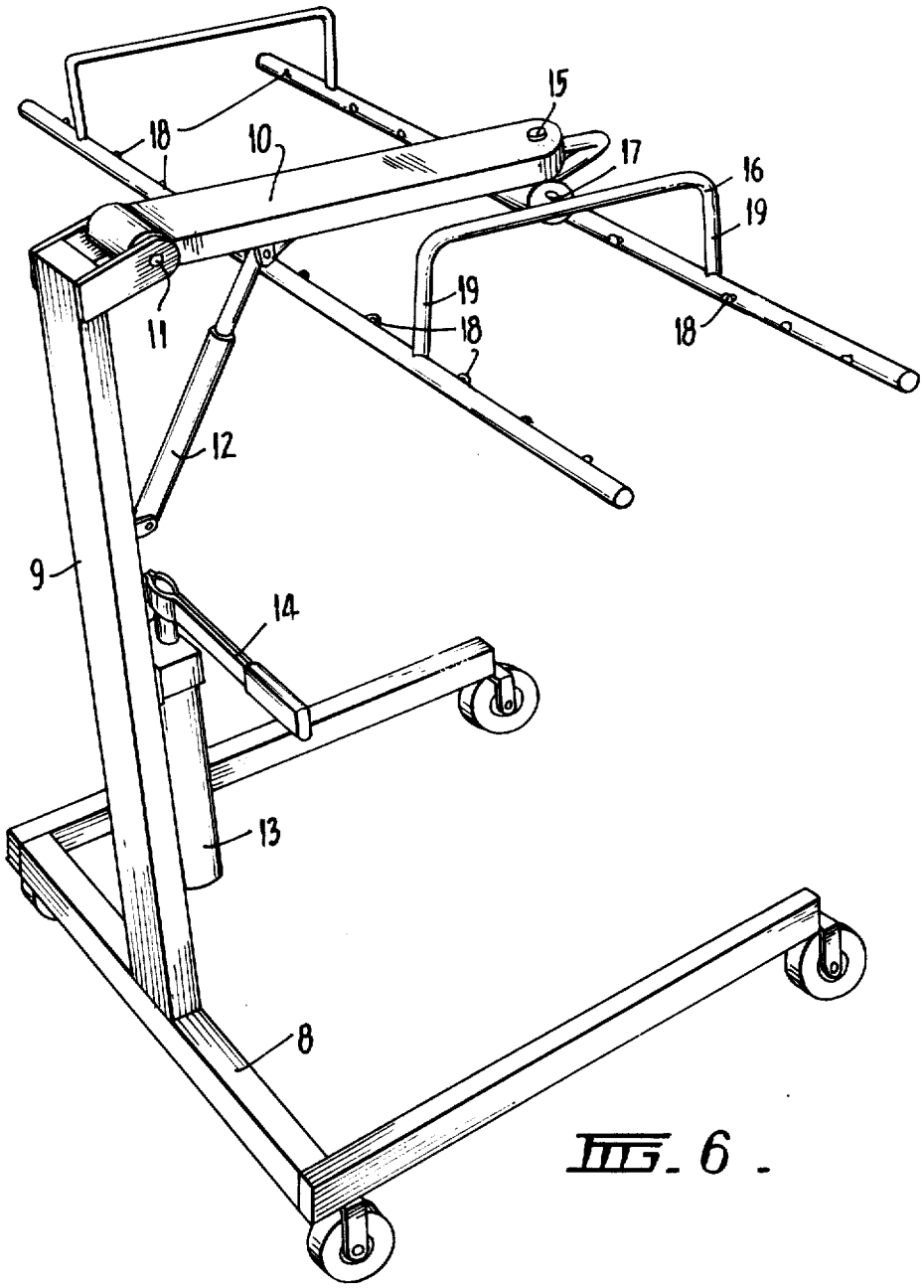
FIG. 6 illustrates the mobile lifting apparatus according to the invention.

FIGS. 3 to 5 show a batten for use as a seat on the mobile lifting apparatus shown in FIG. 6. The holes 5 are so positioned that the bisecting line 6 will lie in the plane through which the weight of the body acts. The cut away section 7 avoids sliding the seat under that part of the body where the weight is concentrated.

In FIG. 6 the wheeled chassis 8 carries the vertical support arm 9 from which the hydraulically adjustable jib arm 10 extends. The jib arm pivots vertically at 11 and can be raised or lowered by telescoping arm 12 operated by a fluid extending from the fluid reservoir 13 and pumped by operating lever 14.

A vertical pivot 15 allows the frame 16 to be rotated in a horizontal plane while the pivot 17 allows for rotation in a vertical plane.

Spigots 18 are adapted to support battens shown in FIG. 2 or that shown in FIGS. 3 to 5.

If the body is to be supported in a sitting position spigots on the arm 19 of the frame 16 are used to support battens extending around the back of the patient.

Figure 7:
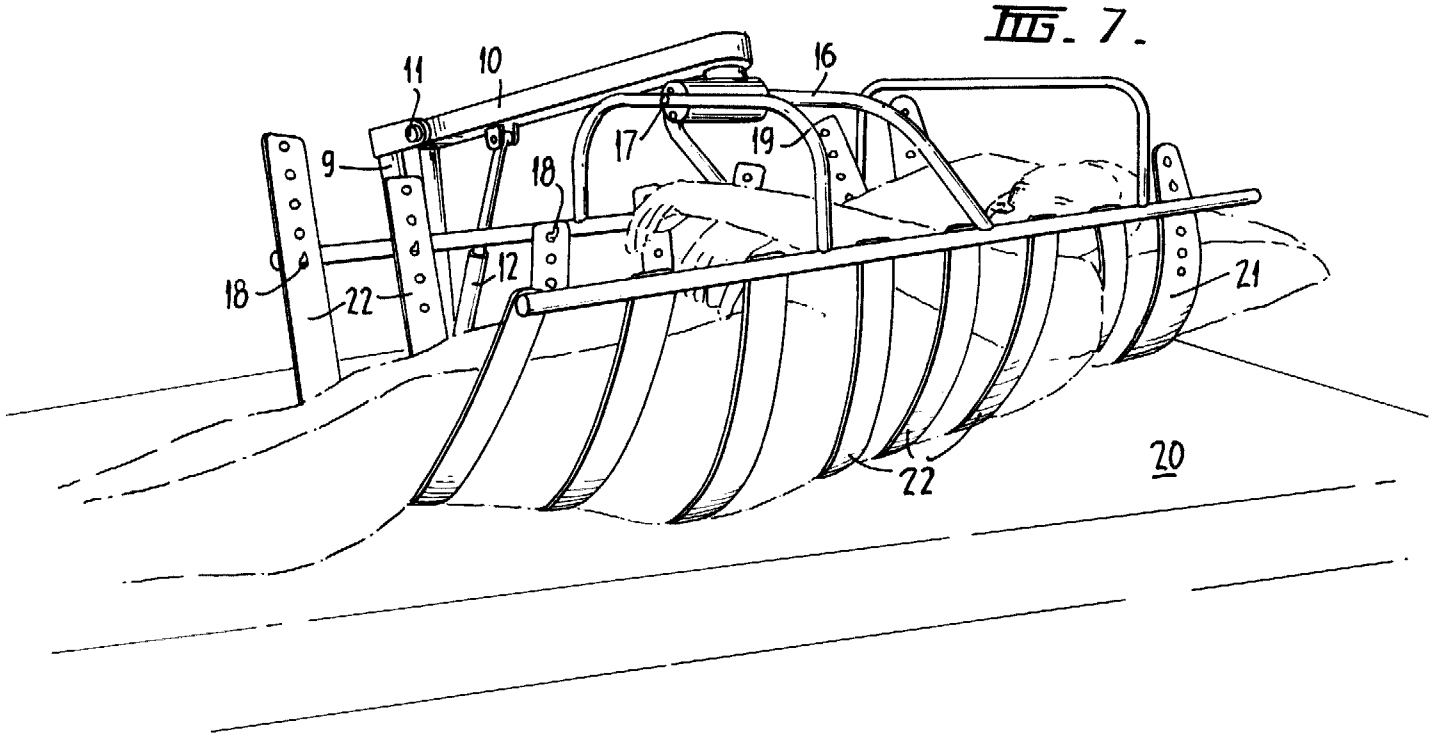
FIG. 7 illustrates a patient in the supine position supported by the apparatus shown in FIG. 6.

FIG. 7 shows a patient lying on a bed 20 in position to be lifted by the apparatus of FIG. 6. The head batten 21 supports the head and it can be seen that this batten and each of the other battens 22 vary in the distance they extend below the frame. A batten is placed under the knees the thighs, the small of the back and at several points between the small of the back and the shoulders, and a further batten is placed under the upper part of the shoulders at the base of the neck. It can be seen in FIG. 7 that the effective length of each batten between the sides of the frame varies according to the position of that part of the body which it supports. For a patient in the supine position those parts of the body in which the body weight is concentrated (e.g. buttocks and shoulders) will be lower than other parts such as the knees and the small of the back.

From the foregoing it will be seen that the present invention provides a unique means of moving injured or invalid persons or animals without aggravating their injuries by disturbing the assumed posture.

This prime advantage is supplemented by the cradling effect of the battens due to their extending below the plane of the frame and partially holding the sides of the patient to prevent any laterial movement of the patients body.

A further advantage is that in certain circumstances such as where stomach injuries have been inflicted, it is desirable to place the patient into an assumed posture (in a partially bent posture) to afford better protection. This can easily be achieved using the carrying device according to the above invention, the weight of the various parts of the body being substantially equally supported as described above.

A still further advantage, afforded by one aspect of the invention, is that incapacitated persons, may be moved with the minimum of disturbance, no change in position being required.

We claim:

1. A carrying device for medical or veterinary use comprising:

a frame having side members joined by end members.

support means dependent from said frame for supporting said frame at least 3 inches above the surface on which it is supported;

a plurality of flexible battens adapted to extend said side members, each of said spigots being inclined inwardly of said frame;

A plurality of flexible battens adapted to extend across said frame and attachable to said spigots of each of said side members, [the ends of said battens being tapered] and each of said battens having means for selectively adjusting the effective length thereof when attached to said side members, said means for adjusting comprising a plurality of holes spaced along each of said battens, said holes being dimensioned to receive said spigots.

2. A carrying device for medical or veterinary use comprising:

a lifting apparatus including a wheeled chassis, a vertical support arm carried by said chassis, an adjustable jib attached to said support arm, and means for adjusting said jib in a vertical plane with respect to said support arm;

a frame supported from said jib and including side members joined by end members and having a plurality of headed spigots spaced along each of said side members, each of said spigots being inclined inwardly of said frame; and a plurality of flexible battens adapted to extend across said frame and attachable to said spigots of each of said side members, each of said battens having means for selectively adjusting the effective length thereof when attached to said side members, said means for adjusting comprising a plurality of holes spaced along each of said battens, said holes being dimensioned to receive said spigots.

*3. A device as claimed in claim 1, wherein the ends of said battens are tapered.*

* * * * *

UNITED STATES PATENT AND TRADEMARK OFFICE

CERTIFICATE OF CORRECTION

PATENT NO. : Re. 28,620

DATED : November 25, 1975

INVENTOR(S) : Donald Alfred Jordan and Laurence John Hartnett

It is certified that error appears in the above–identified patent and that said Letters Patent are hereby corrected as shown below:

Column 6, line 20, "a plurality of flexible battens adapted to extend" should be -- a plurality of headed spigots spaced along each of --;

Column 6, line 23, "A" should be -- a --.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*